United States Patent
Larsson et al.

(10) Patent No.: US 11,999,262 B2
(45) Date of Patent: Jun. 4, 2024

(54) BATTERY CONTROL ASSEMBLY FOR A BATTERY SYSTEM AND ELECTRIC DRIVETRAIN FOR AN ELECTRIC VEHICLE

(71) Applicant: Volvo Car Corporation, Gothenburg (SE)

(72) Inventors: Torbjorn Larsson, Gothenburg (SE); Jonas Forssell, Gothenburg (SE); Robert Eriksson, Gothenburg (SE); Nikitas Sidiropoulos, Gothenburg (SE); Markus Ekström, Gothenburg (SE); Narendar Rao Gannamaneni, Gothenburg (SE); Jonas Björkholtz, Gothenburg (SE); Yafan Zhang, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 7 days.

(21) Appl. No.: 18/074,593

(22) Filed: Dec. 5, 2022

(65) Prior Publication Data
US 2023/0173948 A1   Jun. 8, 2023

(30) Foreign Application Priority Data
Dec. 6, 2021  (EP) ..................... 21212610

(51) Int. Cl.
*B60L 58/18* (2019.01)
*B60L 53/22* (2019.01)
(Continued)

(52) U.S. Cl.
CPC .............. *B60L 58/18* (2019.02); *B60L 53/22* (2019.02); *H01M 10/46* (2013.01);
(Continued)

(58) Field of Classification Search
CPC ........ B60L 58/18; B60L 53/22; H01M 10/46; H01M 2220/20; H02J 7/0045; H02J 7/0063
See application file for complete search history.

(56) References Cited

U.S. PATENT DOCUMENTS

| 2015/0280604 A1* | 10/2015 | Hassanpoor ........ H02M 7/4833 363/126 |
| 2018/0043789 A1 | 2/2018 | Goetz et al. |
| 2021/0197676 A1 | 7/2021 | Goetz et al. |

FOREIGN PATENT DOCUMENTS

| DE | 102013009381 A1 | 12/2014 |
| DE | 102018109922 A1 | 10/2019 |

OTHER PUBLICATIONS

May 17, 2022 European Search Report issued in corresponding International Application No. 21212610.

* cited by examiner

*Primary Examiner* — Carlos Amaya
(74) *Attorney, Agent, or Firm* — Clements Bernard Walker; Christopher L. Bernard (57) ABSTRACT

A battery control assembly for a battery system. The battery control assembly includes a plurality of cell-level control units, each including a cell-level switching unit being operable as a cell-level inverter. The plurality of cell-level control units are arranged in three control unit strings and the cell-level control units of each control unit string are electrically connected in series. First ends of each control unit string are electrically connected to a corresponding AC charging terminal. Second ends of the control unit strings are electrically connected in series via a first end switch and a second end switch. Moreover, at least one of the control unit strings includes an inner connection terminal. Furthermore, (Continued)

an electric drivetrain for an electric vehicle having such a battery control assembly is presented.

15 Claims, 6 Drawing Sheets

(51) Int. Cl.
*H01M 10/46* (2006.01)
*H02J 7/00* (2006.01)
(52) U.S. Cl.
CPC .......... *H02J 7/0045* (2013.01); *H02J 7/0063* (2013.01); *H01M 2220/20* (2013.01)

| Usecase | 54 | 56 | 58 | 60 | 46b | 46a | 36a | 36b | 36c | 40 |
|---|---|---|---|---|---|---|---|---|---|---|
| Parked vehicle, System off | | | | | | | | | | |
| Parked vehicle, Workshop service mode | | | | | | | | | | |
| Parked vehicle, System on, Stand by | | | 1 | 1 | | | | | | |
| Driving | | | 1 | 1 | | | | | | |
| DC charging, 400V | 1 | 1 | 1 | 1 | 1 | 1 | | | | |
| DC charging, 800V | 1 | 1 | 1 | 1 | 1 | 1 | | | | |
| AC charging, 1-phase | 1 | 1 | 1 | 1 | | | 1 | | | 1 |
| AC charging, 3-phase | 1 | 1 | | | | | 1 | 1 | 1 | 1 |

| Usecase | 54 | 56 | 68 | 70 | 58 | 60 | 46b | 46a | 64a | 64c | 36a | 36b | 36c | 40 |
|---|---|---|---|---|---|---|---|---|---|---|---|---|---|---|
| Parked vehicle, System off | | | | | | | | | | | | | | |
| Parked vehicle, Workshop service mode | | | | | 1 | 1 | | | | | | | | |
| Parked vehicle, System on, Stand by | | | | | 1 | 1 | | | | | | | | |
| Driving, 2WD | | | 1 | | | | | | | | | | | |
| Driving, 2WD, alt. | | | | 1 | | | | | | | | | | |
| Driving, 4WD | | | | | 1 | 1 | 1 | 1 | 1 | 1 | | | | |
| DC charging, 400V | 1 | 1 | | | 1 | 1 | 1 | 1 | | | | | | |
| DC charging, 800V | 1 | 1 | | | 1 | 1 | 1 | 1 | | | | | | |
| AC charging, 1-phase | 1 | 1 | | | | | | | | | 1 | | | 1 |
| AC charging, 3-phase | 1 | 1 | | | | | | | | | 1 | 1 | 1 | 1 |

| Usecase | 36a | 36b | 36c | 40 | 46c | 46b | 58 | 54 | 56 | 46a |
|---|---|---|---|---|---|---|---|---|---|---|
| AC charging, 1-phase | 1 | | | 1 | | | | | | |
| AC charging, 3-phase | 1 | 1 | 1 | 1 | | | 1 | 1 | 1 | |
| DC charging, 400V | | | | | 1 | 1 | 1 | 1 | | 1 |
| DC charging, 800V | | | | | 1 | 1 | 1 | 1 | | 1 |
| Driving on DC to inverter | | | | | 1 | 1 | 1 | 1 | | 1 |
| Battery pack heat | | | | | | 1 | 1 | 1 | | |
| Parked | | | | | | | | | | |

Fig. 7

BATTERY CONTROL ASSEMBLY FOR A BATTERY SYSTEM AND ELECTRIC DRIVETRAIN FOR AN ELECTRIC VEHICLE

CROSS-REFERENCE TO RELATED APPLICATION

The present disclosure claims the benefit of priority of European Patent Application No. 21 212 610.6, filed on Dec. 6, 2021, and entitled "BATTERY CONTROL ASSEMBLY FOR A BATTERY SYSTEM AND ELECTRIC DRIVETRAIN FOR AN ELECTRIC VEHICLE," the contents of which are incorporated in full by reference herein.

TECHNICAL FIELD

The present disclosure relates to a battery control assembly for a battery system. Moreover, the disclosure is directed to an electric drivetrain for an electric vehicle including such a battery control assembly.

BACKGROUND

Battery control assemblies and drivetrains are for example used in battery electric vehicles (BEV), hybrid electric vehicles (HEV) and plug-in hybrid electric vehicles (PHEV).

When using such a vehicle, a user may encounter different charging situations, e.g. AC (alternating current) charging or DC (direct current) charging. Also different charging voltages may be found. Thus, from the perspective of a user it is desirable to have a battery control assembly and a drivetrain which is compatible with different charging situations.

From the perspective of a manufacturer of a battery control assembly, drivetrain or a vehicle having such a drivetrain or battery control assembly, it is desirable to produce drivetrains and battery control assemblies which can be used for a wide variety of vehicles. Additionally, the manufacturer aims for low manufacturing costs which usually leads to the objective of having as few components as possible within a drivetrain of an electric vehicle.

Thus, both the user and the manufacturer aim for universal usability of the battery control assembly and the drive train. It is obvious that the perspective of the vehicle user and the perspective of the manufacturer implies a conflict of objectives.

BRIEF SUMMARY

It is an objective of the present disclosure to at least partially solve this conflict of objectives. The problem is at least partially solved or alleviated by the subject matter of the present disclosure.

According to a first aspect, there is provided a battery control assembly for a battery system, the battery control assembly includes a plurality of cell-level control units, wherein each of the cell-level control units is electrically connectable to an associated single battery cell or to an associated group of battery cells. Moreover, each of the cell-level control units includes a cell-level switching unit being operable as a cell-level inverter. The plurality of cell-level control units is arranged in three control unit strings, wherein the cell-level control units of each control unit string are electrically connected in series. Furthermore, each of the control unit strings includes a first end and a second end, the second end being arranged electrically opposite the first end. The first end of each control unit string is electrically connected to a corresponding AC charging terminal. The second ends of the three control unit strings are electrically connected in series via a first end switch and a second end switch. Moreover, at least one of the control unit strings includes an inner connection terminal being arranged such that at least one cell-level control unit forming part of the respective control unit string is arranged on each side of the inner connection terminal. The inner connection terminal is connectable to a DC charging or discharging terminal or a further inner connection terminal.

For the connection of the cell-level control units among each other, each of the cell-level control units may include two connection terminals. These connection terminals may be separate from connection terminals by which the single battery cell or the group of battery cells is connected to the respective cell-level control unit.

The cell-level switching unit may include an H-shaped circuit, wherein a switch is located in each of the four legs of the H-shape. The switches may be realized by transistors. The connection terminal for connecting the cell-level control units among each other may be arranged in a middle section of the H-shaped circuit. In such a configuration, each of these connection terminals may be connected to a positive pole of the respective battery cell or group of battery cells via a first switch and to a negative pole of the respective battery cell or group of battery cells via a second switch. Depending on the switching states of the switches, the cell-level control unit may be in a state in which a polarity of a connectable battery cell or group of battery cells may be maintained. In a different state, the polarity of the battery cell or the group of battery cells may be inverted by the switching unit of the cell-level control unit. Depending on the manner of operating the switches, a DC current or an AC current may be provided, i.e. the switching unit may be operated as an inverter. Moreover, a switching state is possible where the battery cell or the group of battery cells being connectable to the cell-level control unit is bypassed. In a further alternative state, the connection terminals for connecting the single battery cell or the group of battery cells is electrically disconnected from the cell-level control unit. The switching unit includes a control unit for operating the switches.

Furthermore, each of the cell-level control units may include a DC-DC converter. Such a DC-DC converter is galvanically separated from the remaining portions of the respective cell-level control unit by a transformer. Thus, a DC voltage differing from the voltage of a battery cell or a group of battery cells being connected to the cell-level control unit can be provided or received.

Thus, using a cell-level control unit, a corresponding battery cell or group of battery cells can be used for providing either DC current or AC current. Moreover, the cell-level control unit makes it possible to charge the corresponding battery cell or group of battery cells by AC current or DC current. Considering all cell-level control units together and all battery cells that can be connected thereto together, it is obvious that a battery system being equipped with a battery control assembly of the present disclosure is flexible in terms of charging and discharging. Moreover, the at least one inner connection terminal offers further options for charging and discharging. In summary, due to the battery control assembly, the battery system can be universally used.

The cell-level control units may be configured as semiconductor assemblies, i.e. assemblies including at least one semiconductor part. The semiconductor part may be arranged on a circuit board such that each cell-level control unit includes one main circuit board on which the at least one semiconductor part and/or auxiliary circuit boards are mechanically arranged and electrically contacted.

In an example, the battery control assembly is configured as one module or one mounting unit. Thus, a battery system equipped therewith includes very few components and is therefore structurally simple. The battery control assembly according to the present disclosure can even be used as an integrated part of a battery system.

It is noted that the battery control system can be used in connection with a battery system of an electric vehicle, e.g. REV, PHEV, BEV. However, it is also possible to use the battery control assembly of the present disclosure in connection with a back-up power unit in a house.

In an example, each first end is electrically connected to the respective AC charging terminal via a respective AC terminal switch. Thus, the battery control assembly renders it possible to charge battery cells being connected thereto via a flexible number of AC charging phases varying between single-phase charging and three-phase-charging. Of course, also all AC charging terminals can be electrically disconnected in a situation in which no AC charging is desired.

In an example, at least one of the second ends is electrically connected to a neutral terminal via a neutral terminal switch. Thus, also the neutral terminal may be electrically disconnected if desired.

The neutral terminal and the AC charging terminals together may form an interface for AC charging. As explained before this interface is suitable for single-phase charging, two-phase charging and three-phase charging. It may also be completely disconnected.

In an example, each of the first ends may be electrically connected to a respective first AC machine terminal for connecting a first AC electric machine to the battery control assembly. The battery control assembly is thus configured for connecting a first AC electric machine to the battery cells which are associated with the battery control assembly. This is useful if the battery control assembly is used in an electric vehicle. It has to be noted that in the present context, the term "first" is only used for the ease of explanation. A number of AC electric machines is not implied.

In another example, at least two out of the first ends are electrically connected to the respective first AC machine terminal via a respective first AC machine terminal switch and a respective second AC machine terminal switch. Consequently, the corresponding AC machine terminals can be electrically disconnected from the remaining parts of the battery control assembly if desired. If a first AC electric machine is electrically and mechanically connected to the battery control assembly, it can be switched off via the first and second AC machine terminal switches.

In an example, each of the second ends may be electrically connected to a respective second AC machine terminal for connecting a second AC electric machine to the battery control assembly. The battery control assembly is thus configured for connecting a second AC electric machine to the battery cells which are associated with the battery control assembly. This is useful if the battery control assembly is used in an electric vehicle. It has to be noted again, that in the present context, the term "second" is only used for the ease of explanation. A number of AC electric machines is not implied.

In an example, the battery control assembly may be configured for being used in a drivetrain of a 2WD (two-wheel drive) electric vehicle. In such a case, a second AC electric machine may be connected to the second AC machine terminals.

In another example, the battery control assembly may be configured for being used in a drivetrain of a 4WD (four-wheel drive) electric vehicle. In such a case both a first AC electric machine and a second AC electric machine may be connected to the respective terminals.

In an example, at least one of the control unit strings includes a DC output interface having a first DC output terminal and a second DC output terminal. The DC output interface may be arranged such that a DC voltage of a single battery cell may be provided or a DC voltage of a group of battery cells may be provided. The battery cells forming the group of battery cells may be electrically connected in parallel or in series. Moreover, due to the switching properties as explained above, depending on the desired case, the first DC output terminal may be a positive pole and the second DC output terminal may be a negative pole or vice versa. Thus, a desired DC voltage can be provided at a desired polarity. This is useful for powering auxiliary drives, e.g. an air conditioning, a heating unit or a ventilation unit of an electric vehicle being equipped with a battery control assembly according to the present disclosure.

In an example, more than one DC output interfaces are provided in one of the control unit strings. The voltage of these DC output interfaces may be the same. Thus within a control unit string, DC output interfaces are provided in a redundant manner thereby enhancing the operational reliability of such an output interface.

In another example, more than one control unit string has a DC output interface. Again, the voltages provided by these DC output interfaces may be the same. Thus, also in this case, the DC output interfaces are provided in a redundant manner.

In an example, at least two out of the first ends are electrically connected via a third end switch. Thus, the respective ends may be electrically connected in series thereby connecting the respective control unit strings in parallel. Consequently, the battery control assembly can be adapted to different AC charging situations.

In an example, the first ends are electrically connected in series via the third end switch and a fourth end switch. This further enhances the flexibility of the battery control assembly with respect to different AC charging situations.

In an example, each control unit string includes an inner connection terminal and the inner connection terminals are electrically connected in series via a respective first inner switch and a respective second inner switch. This is useful for selectively using the battery control assembly in a 4WD vehicle.

In an example, one inner connection terminal or at least one of the first ends is electrically connected to a first DC charging and discharging terminal. Thus, DC charging of battery cells being electrically connected to the battery control assembly is facilitated.

In another example, at least one of the first ends and/or at least one of the second ends is connected to a second DC charging and discharging terminal. Also this configuration leads to facilitated DC charging.

According to a second aspect there is provided an electric drivetrain for an electric vehicle, having a battery control assembly according to the present disclosure. Such a drivetrain may be used very flexibly, i.e. can be used in a high number of application scenarios such as DC charging, AC charging, AC discharging and DC discharging.

In an example, the electric drivetrain includes a first AC electric machine being electrically connected to the battery control assembly via the first AC machine terminals, and/or a second AC electric machine being connected to the battery control assembly via the second AC machine terminals. Thus, the drivetrain is suitable for both 4WD vehicles and 2WD vehicles. It is noted that the battery control assembly does not need to be changed in this context.

In another example, a single battery cell or a group of battery cells is electrically connected to each of the cell-level control units. The battery cells and the battery control assembly may thus form a battery system or battery pack. Such a battery system essentially forms one mounting unit and therefore is easy to manipulate and to assemble into a corresponding vehicle.

It should be noted that the above examples may be combined with each other irrespective of the aspect involved. Accordingly, the battery control assembly may be combined with features of the electric drivetrain and, likewise, the electric drivetrain may be combined with features described above with regard to the battery control assembly.

These and other aspects of the present disclosure will become apparent from and elucidated with reference to the examples described hereinafter.

BRIEF DESCRIPTION OF THE DRAWINGS

Examples of the disclosure will be described in the following with reference to the following drawings.

The figures are merely schematic representations and serve only to illustrate examples of the disclosure. Identical or equivalent elements are in principle provided with the same reference signs.

DETAILED DESCRIPTION

Figure 1:
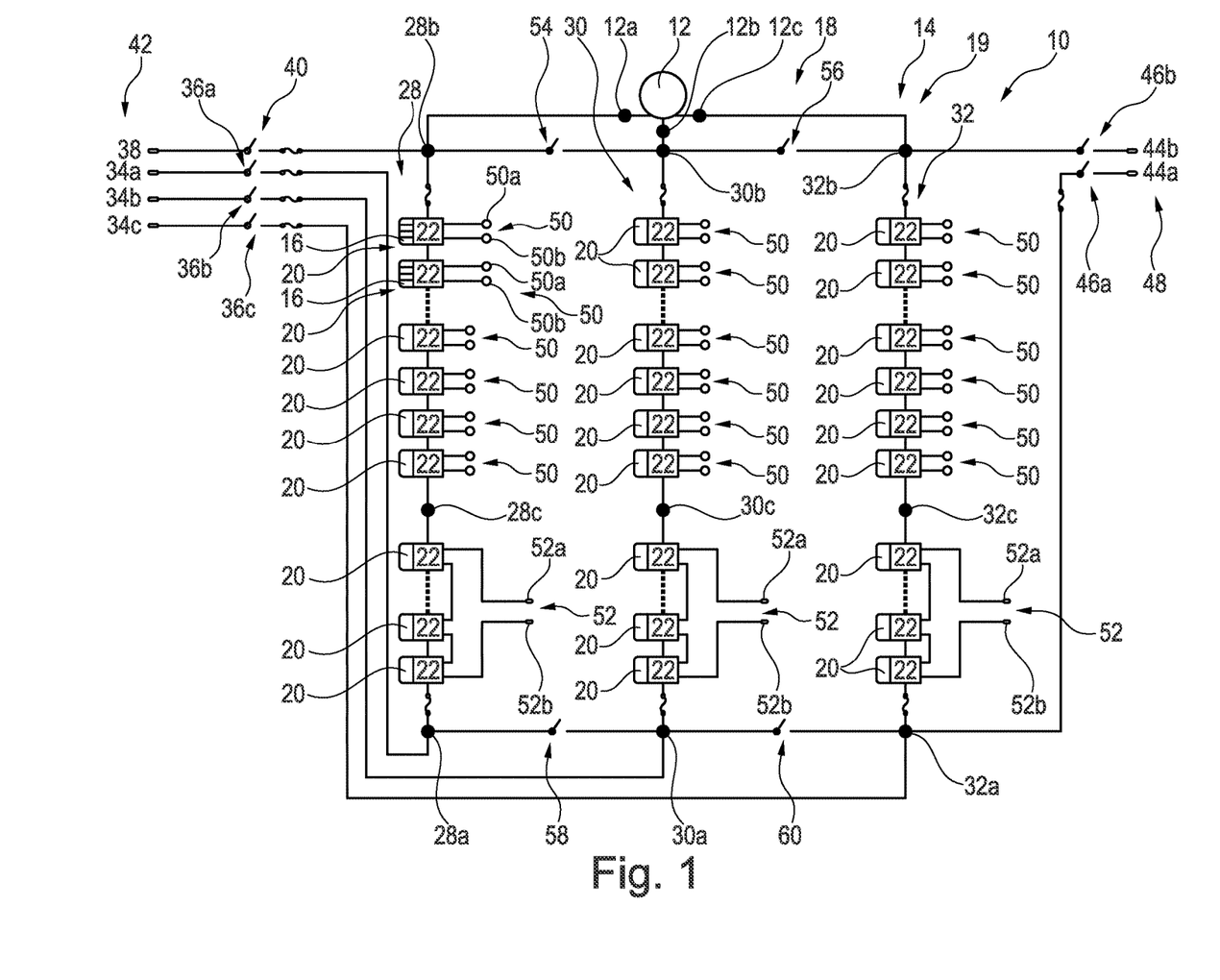
FIG. 1 shows an electric drivetrain according to a first example, having a battery control assembly according to a first example.

FIG. 1 shows an electric drive train 10 for a 2WD electric vehicle. In the present example, a rear axle of the electric vehicle may be driven. The electric drive train 10 includes an AC electric machine 12 which is a permanent-magnet synchronous machine (PMSM) in the present example. Alternatively, an AC electric machine being an asynchronous motor (ASM) can be used. Since the AC electric machine 12 drives the rear axle, it can also be called an electric rear axle drive (ERAD). Moreover, the AC electric machine 12 is a three-phase AC electric machine.

In the remaining parts of the present disclosure, the AC electric machine 12 is designated a second AC electric machine.

The drivetrain 10 further includes a battery 14 which is only schematically represented in FIG. 1 by a plurality of battery cells 16 forming the battery 14. For better visibility only some of the battery cells 16 in FIG. 1 are equipped with a reference sign. Moreover, the electric drivetrain includes a battery control assembly 18.

The battery 14 and the battery control assembly 18 together form a battery system 19. The AC electric machine 12 is connected to the battery 14 formed by the battery cells 16 via the battery control assembly 18.

In more detail, the AC electric machine 12 is electrically connected to the battery control assembly 18 via corresponding AC machine terminals 12a, 12b, 12c of the battery control assembly 18.

As far as the battery 14 is concerned, the battery cells 16 are arranged in groups 20 of battery cells 16. In the example of FIG. 1, each group 20 includes four battery cells 16 being electrically connected in series. If it is assumed that each battery cell 16 can provide a voltage of 3.7V, then the group 20 including four battery cells 16 would provide a voltage of 14.8V.

It is important to note that having groups 20 of four battery cells is purely illustrative. Depending on the targeted application, the number of battery cells forming a group 20 can be adapted such that a desired voltage resolution and performance of the corresponding battery system is realized. Other exemplary groups include three, two or even a single battery cell 16.

The battery control assembly 18 includes a plurality of cell-level control units 22. Each of the cell-level control units 22 is electrically connected to an associated group 20 of battery cells 16. This can best be seen in FIG. 2. Moreover, each of the cell-level control units 22 includes a cell-level switching unit 24 which can be operated as a cell-level inverter. To this end, the switching unit 24 uses the DC voltage of the associated group 20 of battery cells 16 as an input voltage.

Figure 2:
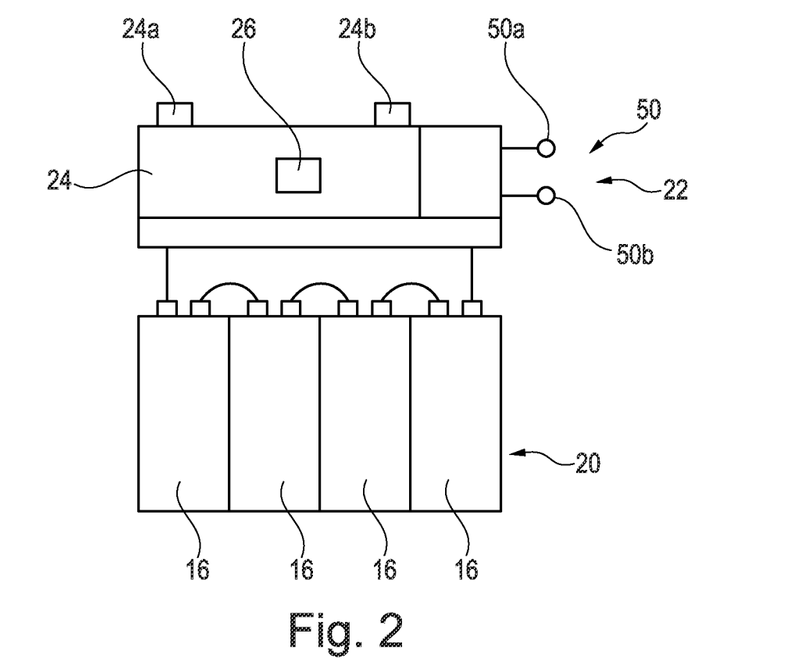
FIG. 2 shows a cell-level control unit of the battery control assembly of FIG. 1 in an isolated representation.

As an output interface, the switching unit 24 has two output terminals 24a, 24b which also serve as the output terminals of the cell-level control unit 22. Thus, the output terminals 24a, 24b are used for connecting the cell-level control unit 22 to one or two neighboring cell-level control units 22.

Within the switching unit 24, the output terminal 24a is connected to the positive pole of the group 20 of battery cells 16 via a first switch being realized by a transistor. Additionally, the output terminal 24a is connected to the negative pole of the group 20 of battery cells 16 via a second switch being also realized by a transistor. In the same manner, the output terminal 24b is connected to the positive pole of the group 20 of battery cells 16 via a third switch being realized by a transistor. Moreover, the output terminal 24b is connected to the negative pole of the group 20 of battery cells 16 via a fourth switch being also realized by a transistor. Thus, the switching unit 24 can be operated as an inverter by controlling the switches accordingly.

Of course, it is also possible to provide a DC voltage at the terminals 24a, 24b by connecting terminal 24a to the positive pole of the group 20 of battery cells 16 via the first switch. The second switch is open in this configuration. The terminal 24b is connected to the negative pole of the group 20 of battery cells 16 via the fourth switch. At the same time, the third switch is open.

It is obvious that also the opposite polarity of DC voltage can be provided at the terminals 24a, 24b if the second switch and the third switch are closed and the first switch and fourth switch are opened.

Moreover, the group 20 of battery cells 16 can be electrically disconnected from the battery control assembly 22 by opening all switches.

It is also possible to realize a so-called bypass mode if both terminals 24a, 24b are connected to the positive pole of the group 20 of battery cells 16 by closing the first and third switch or if both terminals 24a, 24b are connected to the negative pole of the group 20 of battery cells 16 by closing the second and fourth switch.

The switching unit 24 includes a control unit 26 for controlling the switches in the above-described manner.

In the battery control assembly 18, the plurality of cell-level control units 22 are arranged in three control unit strings 28, 30, 32. Within each of the control unit strings 28, 30, 32, the cell-level control units 22 are electrically connected in series via the respective terminals 24a, 24b (see FIGS. 1 and 2 in combination). Each of the control unit strings 28, 30, 32 including a respective first end 28a, 30a, 32a and a respective second end 28b, 30b, 32b. The second ends 28b, 30b, 32b are arranged electrically opposite the respective first ends 28a, 30a, 32a. Moreover, each of the control unit strings 28, 30, 32 includes an inner connection terminal 28c, 30c, 32c being arranged such that a portion of the cell-level control units 22 forming part of the respective control unit string 28, 30, 32 is arranged on each side of the inner connection terminal 28c, 30c, 32c. Furthermore, each of the second ends 28b, 30b, 32b is electrically connected to a respective one of the AC machine terminals 12a, 12b, 12c to which in the present example, the AC electric machine 12 is connected.

In more detail, second end 28b is electrically connected to AC machine terminal 12a, second end 30b is electrically connected to AC machine terminal 12b and second end 32b is electrically connected to AC machine terminal 12c. The first end 28a, 30a, 32a of each control unit string 28, 30, 32 is electrically connected to a corresponding AC charging terminal 34a, 34b, 34c.

In more detail, first end 28a is electrically connected to AC charging terminal 34a via an AC terminal switch 36a. First end 30a is electrically connected to AC charging terminal 34b via an AC terminal switch 36b. First end 32a is electrically connected to AC charging terminal 34c via an AC terminal switch 36c. Additionally, the second end 28b is electrically connected to a neutral terminal 38 via a neutral terminal switch 40.

The AC charging terminals 34a, 34b, 34c and the neutral terminal 38 together form an AC charging interface 42. Additionally, the first end 32a is electrically connected to a first DC charging and discharging terminal 44a.

In this electrical connection, a first DC charging switch 46a is provided such that the first end 32a is electrically connected to the first DC charging and discharging terminal 44a via the first DC charging switch 46a. Moreover, the second end 32b is electrically connected to a second DC charging and discharging terminal 44b.

As before, a switch is provided in this electrical connection. Thus, a second DC charging switch 46b is provided such that the second end 32b is electrically connected to the second DC charging and discharging terminal 44b via the second DC charging switch 46b. The first DC charging and discharging terminal 44a and the second DC charging and discharging terminal 44b together form a DC charging and discharging interface 48 of the battery control assembly 18.

Additionally, each of the control unit strings 28, 30, 32 includes several DC output interfaces having respective first DC output terminals and respective second DC output terminals. This is explained in an exemplary manner for the control unit string 28. The control unit strings 30 and 32 are configured in the same manner. In the first control unit string 28, several cell-level control units include a DC output interface being generally denoted 50 having a first DC output terminal 50a and a second DC output terminal 50b. For better visibility only some of the first DC output terminals 50a and only some of the second DC output terminals 50b are equipped with a reference sign.

The DC output interfaces 50 may be configured for providing a voltage corresponding to the voltage of the associated group 20 of battery cells 16, e.g. 14.8 V as explained above. However, if the cell-level control unit 22 includes a DC-DC converter, it is possible to provide any desired DC voltage at the DC output interfaces 50. The DC output interfaces 50 can be used for powering auxiliary drives within an electric vehicle.

Additionally, each of the control unit strings 28, 30, 32 includes a further DC output interface 52 having a respective first DC output terminal 52a and a respective second DC output terminal 52b. This is explained in an exemplary manner for the control unit string 28. The control unit strings 30 and 32 are configured in the same manner.

In contrast to the DC output interfaces 50 as explained before, the further DC output interface 52 is formed by a group of adjacent cell-level control units 22 which are electrically connected in series. The further DC output interface 52 is thus configured for providing a voltage corresponding to a multiple of the voltage of the associated group 20 of battery cells 16. Alternatively, in a case in which at least one of the cell-level control units 22 includes a DC-DC converter, it is possible to provide any desired DC voltage at the DC output interfaces 52.

In an example, 27 groups 20 may be connected in series in order to provide a DC voltage of approximately 400V. Such a DC output interface may be used to power an air conditioning, a ventilation unit or a heating unit of an electric vehicle. In another example, three groups 20 may be connected in series in order to provide a DC voltage of approximately 44V. If the DC-DC converter is used, also 48V can be provided. Such a DC output interface may be used to power head lights and/or tail lights of an electric vehicle. Of course, DC voltages of different magnitudes can be realized by connecting an appropriate number of groups 20 in series.

In the example of FIG. 1, the second ends 28b, 30b, 32b of the three control unit strings 28, 30, 32 are electrically connected in series via a first end switch 54 and a second end switch 56. Moreover, the first ends 28a, 30a, 32a of the three control unit strings 28, 30, 32 are electrically connected in series via a third end switch 58 and a fourth end switch 60.

The battery control assembly 18 can thus be controlled as will be explained in connection with the table shown in FIG. 3. In the head column different use cases of an electric vehicle being equipped with such a battery control assembly 18 are noted. In the head lines of the respective columns the different switches of the battery control assembly 18 are identified.

Figure 3:
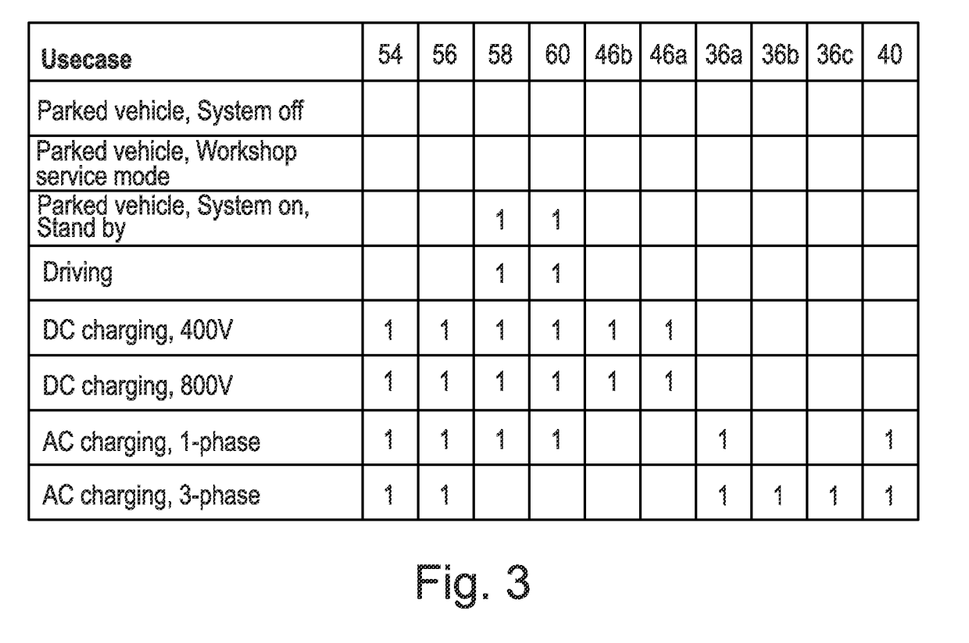
FIG. 3 shows a table representing a control logic of the battery control assembly according to the first example.

The table in FIG. 3 thus shows the corresponding switching states, wherein "1" means that the corresponding switch is closed, i.e. forms an electric connection. An empty table element means that the corresponding switch is open, i.e. forms an electric interruption.

It is assumed that the switches are open by default.

If the electric vehicle is parked, the battery system 19 including the battery control assembly 18 is switched off. This means that all switches are open, i.e. form an electric interruption. The same is true if the vehicle is parked and in a workshop service mode. Also in this use case all switches are open, i.e. form an electric interruption. Of course, this does not exclude the possibility that in the workshop one or more switches are closed for performing a diagnostics procedure concerning the battery system 19.

Before starting to drive, the vehicle may enter a stand by mode, wherein the battery system 19 has to be switched on. In this use case the third end switch 58 and the fourth end switch 60 are closed.

In a driving mode, also the third end switch 58 and the fourth end switch 60 are closed. Consequently, the AC electric machine 12 can be powered by the battery 14. By closing the third end switch 58 and the fourth end switch 60 a neutral point is generated at first end 30a. At this point, the sum of currents is zero when operating the AC electric machine 12. Thus, the third end switch 58 and the fourth end switch 60 need to be closed for having this kind of current cancellation.

The battery control assembly 18 also offers a DC charging functionality. Thus, the vehicle equipped therewith can be in a DC charging mode, wherein the charging voltage is for example 400 V. In this mode, the first end switch 54, the second end switch 56, the third end switch 58 and the fourth end switch 60 are closed. Furthermore, the first DC charging switch 46a and the second DC charging switch 46b are closed. Thus, the control unit strings 28, 30, 32 are connected in parallel when taking the perspective of the DC charging and discharging terminals 44a, 44b.

The vehicle can also be charged using a different charging voltage, e.g. 800V. Compared to DC charging at 400V, the positions of the switches remain the same.

Alternatively, the vehicle may be charged using AC. In a first use case only one phase is available for AC charging. In the present example it is the phase being connected to AC charging terminal 34a. Consequently, AC terminal switch 36a is closed. Furthermore, the first end switch 54, the second end switch 56, the third end switch 58 and the fourth end switch 60 are closed. Also the neutral terminal switch 40 is closed. Thus, taking the perspective of the AC charging terminal 34a and the neutral terminal 38, the control unit strings 28, 30, 32 are electrically connected in parallel and the corresponding battery cells 16 or groups 20 of battery cells 16 are charged in this configuration. The cell-level control units 22 operate as rectifiers in this context.

If three phases are available for AC charging, the first end switch 54 and the second end switch 56 are closed. Furthermore, the AC terminal switches 36a, 36b, 36c and the neutral terminal switch 40 are closed. Thus, the control unit string 28 is electrically connected to AC charging terminal 34a, the control unit string 30 is electrically connected to AC charging terminal 34b, and control unit string 32 is electrically connected to AC charging terminal 34c. All control unit strings 28, 30, 32 are electrically connected to the neutral terminal 38.

Figure 4:
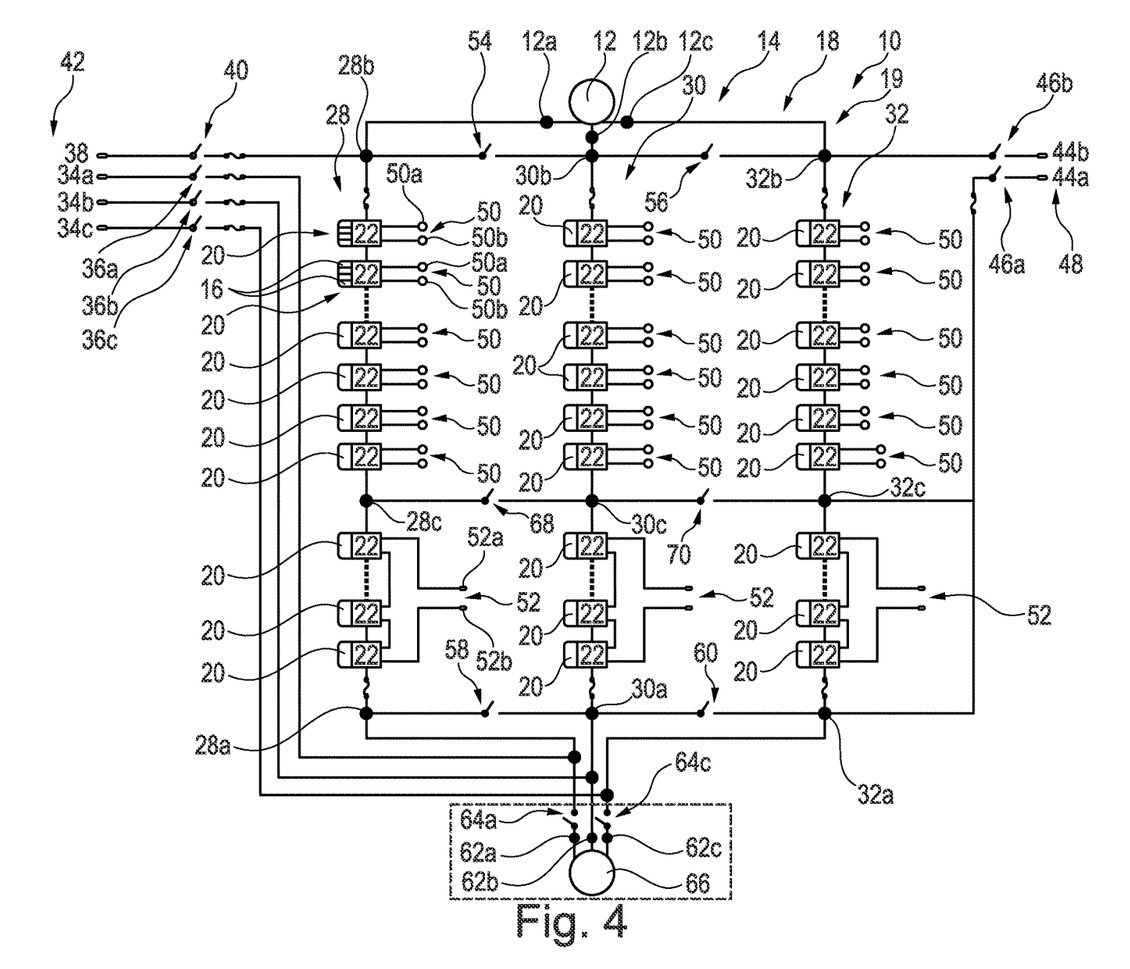
FIG. 4 shows an electric drivetrain according to a second example, having a battery control assembly according to a second example.

FIG. 4 shows an electric drivetrain 10 according to a second example, having a battery control assembly 18 according to a second example. In the following, only the differences with respect to the electric drivetrain 10 according to the first example having a battery control assembly 18 according to the first example will be explained.

In the second example, each of the first ends 28a, 30a, 32a is additionally electrically connected to a respective AC machine terminal 62a, 62b, 62c. In this context, the AC machine terminal 62a is connected to first end 28a via an AC machine terminal switch 64a.

In the same manner, AC machine terminal 62c is connected to the first end 32a via an AC machine terminal switch 64c. The AC machine terminal 62b is directly connected to the first end 30a, i.e. without a switch.

In the drivetrain 10 according to the second example, an AC electric machine 66 is connected to the AC machine terminals 62a, 62b and 62c. The AC electric machine 66 is a three-phase electric machine.

In the drivetrain 10 according to the second example, the AC electric machine 66 is an asynchronous electric machine. The AC electric machine 66 drives the front axle and, thus, can also be called an electric front axle drive (EFAD). In the second example, the AC electric machine 66 is designated a first AC electric machine and the AC electric machine 12 is designated a second AC electric machine.

A further difference to the first example lies in the fact that in the second example, the inner connection terminals 28c, 30c, 32c are electrically connected in series via a respective first inner switch 68 and a respective second inner switch 70.

The table in FIG. 5 shows again shows switching states of the switches of the battery control assembly 18, wherein "1" means that the corresponding switch is closed, i.e. forms an electric connection. An empty table element means that the corresponding switch is open, i.e. forms an electric interruption. It is assumed that the switches are open by default.

Figure 5:
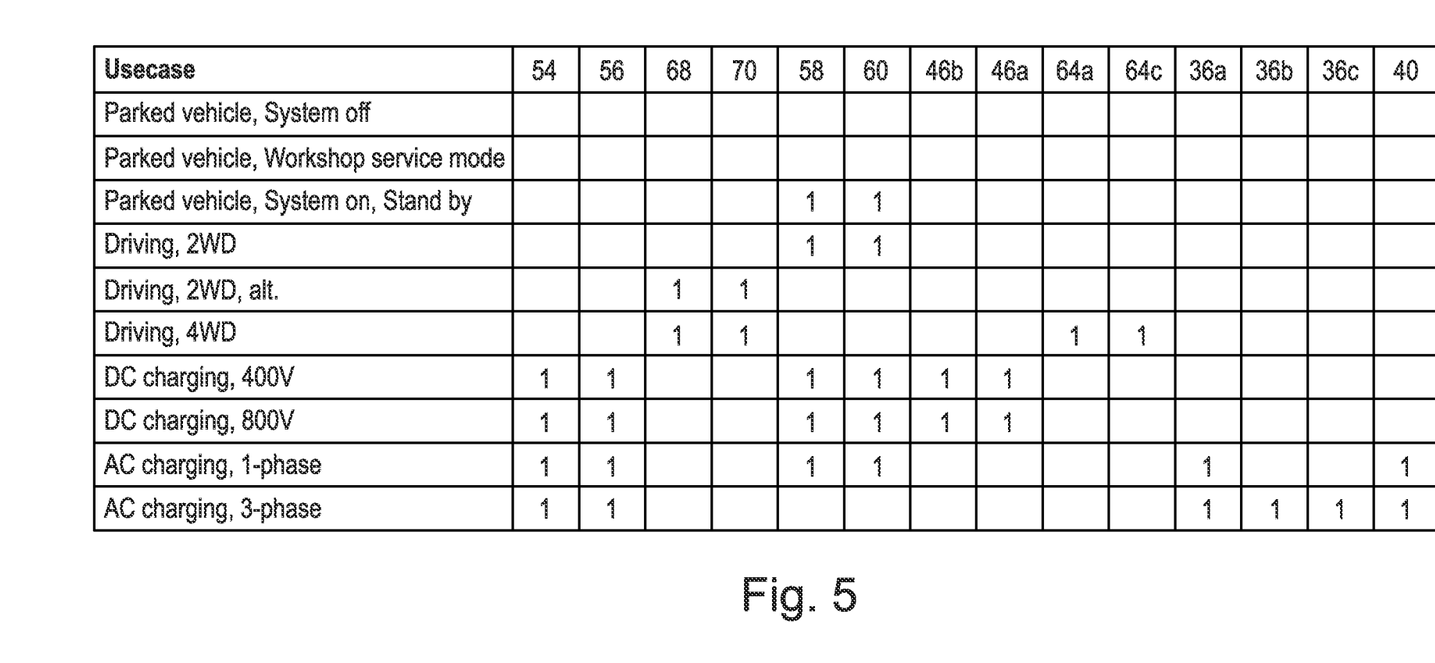
FIG. 5 shows a table representing a control logic of the battery control assembly according to the second example.

If the vehicle is parked, the battery system 19 including the battery control assembly 18 is switched off. This means that all switches are open, i.e. form an electric interruption. The same is true if the vehicle is parked and in a workshop service mode. Also in this use case all switches are open, i.e. form an electric interruption.

Before starting to drive, the vehicle may enter a stand by mode, wherein the battery system 19 has to be switched on. In this use case the third end switch 58 and the fourth end switch 60 are closed. Thus, the battery control system 18 is configured for driving the second AC electric machine 12. As has already been explained before, a neutral point is formed at first end 30a in this configuration.

In a 2WD driving mode, also the third end switch 58 and the fourth end switch 60 are closed. Consequently, the AC electric machine 12 can be powered by the battery 14.

It is noted that also an alternative 2WD driving mode may be provided in which instead of the third end switch 58 and the fourth end switch 60, the first inner switch 68 and the second inner switch 70 are closed. In doing so, the losses in each of the control unit strings 28, 30, 32 are reduced since the operational portions of the control unit strings 28, 30, 32 include less transistors.

The vehicle may also be operated in a 4WD driving mode. Then, the first inner switch 68, the second inner switch 70, the AC machine terminal switch 64a, and the AC machine terminal switch 64c are closed.

The AC machine terminal switches 64a, 64c obviously need to be closed in order to electrically connect the first AC electric machine 66 to the battery control assembly 18. By closing the first inner switch 68 and the second inner switch 70, the battery control assembly 18 and the corresponding battery cells 16 or groups 20 of battery cells are separated into two portions.

A first portion thereof is represented below the inner connection terminals 28c, 30c, 32c in FIG. 4. This portion is used for powering the first AC electric machine 66. A neutral point is now formed at the inner connection terminal 30c.

A second portion is represented above the inner connection terminals 28c, 30c, 32c in FIG. 4. This portion is used for powering the second AC electric machine 12. A neutral point is also formed at the inner connection terminal 30c.

The battery control assembly 18 also offers a DC charging functionality. Thus, the vehicle equipped therewith can be in a DC charging mode, wherein the charging voltage is for example 400V. In this mode, the first end switch 54, the second end switch 56, the third end switch 58 and the fourth end switch 60 are closed. Furthermore, the first DC charging switch 46a and the second DC charging switch 46b are closed. Thus, the control unit strings 28, 30, 32 are connected in parallel when taking the perspective of the DC charging and discharging terminals 44a, 44b.

The vehicle can also be charged using a different charging voltage, e.g. 800V. Compared to DC charging at 400V, the positions of the switches remain the same.

Alternatively, the vehicle may be charged using AC. In a first use case only one phase is available for AC charging. In the present example it is the phase being connected to AC charging terminal 34a. Consequently, AC terminal switch 36a is closed. Furthermore, the first end switch 54, the second end switch 56, the third end switch 58 and the fourth end switch 60 are closed. Also the neutral terminal switch 40 is closed. Thus, the battery cells 16 or groups 20 of battery cells of the respective control unit strings 28, 30, 32 are charged in parallel.

If three phases are available for AC charging, only the first end switch 54 and the second end switch 56 are closed. Furthermore, the AC terminal switches 36a, 36b, 36c and the neutral terminal switch 40 are closed.

Figure 6:
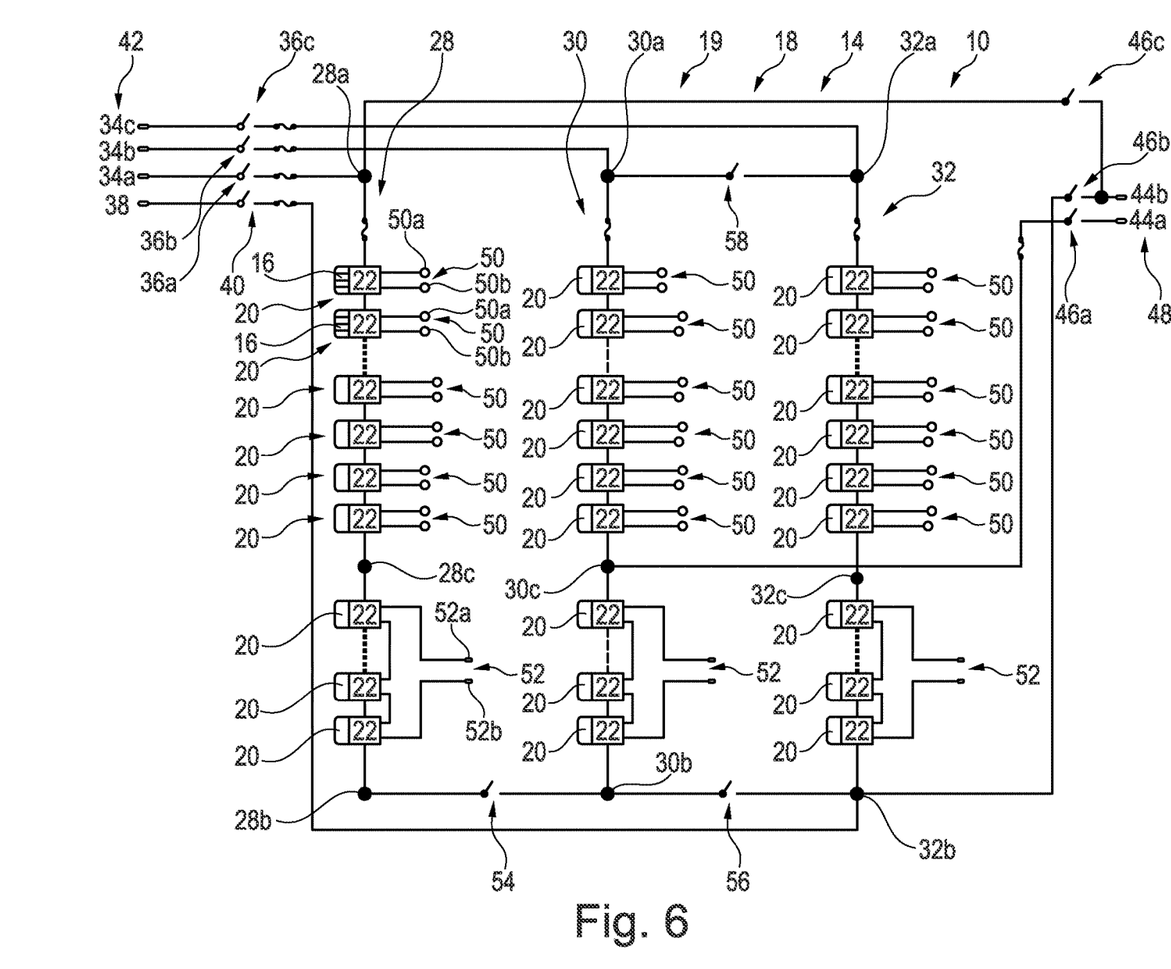
FIG. 6 shows an electric drivetrain according to a third example, having a battery control assembly according to a third example.

FIG. 6 shows an electric drivetrain 10 according to a third example, having a battery control assembly 18 according to a third example. Again, the battery control assembly 18 forms part of a battery system 19 which is part of an electric drivetrain 10. In the following, only the differences with respect to the electric drivetrain 10 according to the first example having a battery control assembly 18 according to the first example and the electric drivetrain 10 according to the second example having a battery control assembly 18 according to the second example will be explained.

In contrast to the previous examples, the battery control assembly 18 of the third example does not include AC machine terminals. Thus in the third example, an electric machine may be connected to the battery control assembly by using the first DC charging and discharging terminal 44a and the second DC charging and discharging terminal 44b. It is understood that if an AC electric machine is connected to the DC charging and discharging terminals 44a, 44b, an inverter unit needs to be interposed. Moreover, in the third example, the fourth end switch 60 is missing as compared to the previous examples.

Additionally, the connection of the control unit strings 28, 30, 32 to the AC charging interface 42 is altered. For this reason, now the respective first ends 28a, 30a, 32a are represented in a top portion of FIG. 6, wherein the respective second ends 28b, 30b, 32b are represented in a lower portion of FIG. 6.

Moreover, in the third example, the inner connection terminal 30c is electrically connected to the first DC charging and discharging terminal 44a via the first DC charging switch 46a.

The second DC charging and discharging terminal 46b is connected to the second end 32b via the second DC charging switch 46b. Additionally, the second DC charging and discharging terminal 46b is electrically connected to the first end 28a via a third DC charging switch 46c.

The table in FIG. 7 again shows switching states of the switches of the battery control assembly 18, wherein "1" means that the corresponding switch is closed, i.e. forms an electric connection. An empty table element means that the corresponding switch is open, i.e. forms an electric interruption. It is assumed that the switches are open by default.

Figure 7:
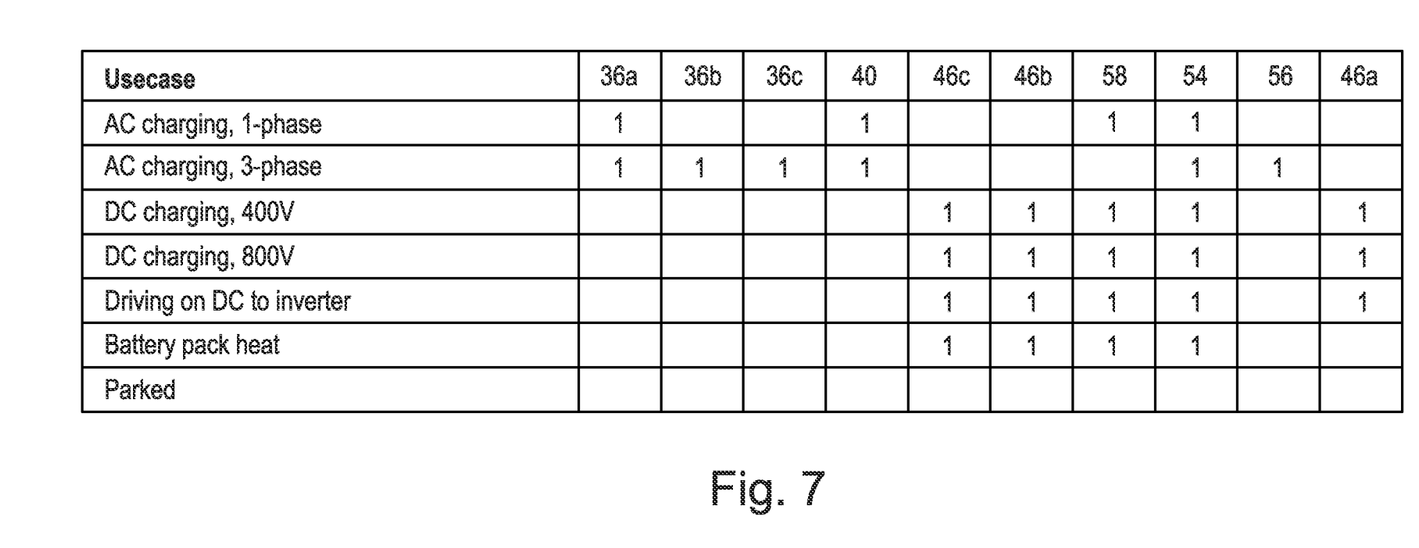
FIG. 7 shows a table representing a control logic of the battery control assembly according to the third example.

If the vehicle is parked, the battery system 19 including the battery control assembly 18 is switched off. This means that all switches are open, i.e. form an electric interruption.

Moreover, in the third example, the battery control assembly 18 offers a battery pack heating functionality. In this use case the DC charging switches 46b, 46c are closed. Also the first end switch 54 and the third end switch 58 is closed. Thus, all control unit strings 28, 30, 32 are electrically connected in series and form a short circuit. This leads to the desired generation of heat.

In a driving mode which uses an electric machine or an inverter for an electric machine being connected to the first DC charging and discharging terminal 44a and the second DC charging and discharging terminal 44b, additionally, the first DC charging switch 46a is closed. Thus, the DC charging switches 46a, 46b, 46c, the third end switch 58 and the first end switch 54 are closed. The three control unit strings 28, 30, 32 are thus subdivided into two portions being electrically connected in parallel. A first portion includes control unit string 28 and the portion of control unit string 30 being represented below inner connection terminal 30c. The second portion includes control unit string 32 and the portion of control unit string 30 being represented above inner connection terminal 30c.

The battery control assembly 18 also offers a DC charging functionality. Thus, the vehicle equipped therewith can be in a DC charging mode, wherein the charging voltage is for example 400 V. The charging voltage is supplied by the DC charging and discharging terminals 44a, 44b. In this mode, the switching situation is the same as in the driving mode. The only difference is that the power flow is inverted. The vehicle can also be charged using a different charging voltage, e.g. 800V. Compared to DC charging at 400V, the positions of the switches remain the same.

Alternatively, the vehicle may be charged using AC. In a first use case only one phase is available for AC charging. In the present example it is the phase being connected to AC charging terminal 34a. Consequently, AC terminal switch 36a is closed. Furthermore, the first end switch 54, the third end switch 58 are closed. Also the neutral terminal switch 40 is closed. Thus, the control unit strings 28, 30, 32 are connected in series.

If three phases are available for AC charging, the first end switch 54 and the second end switch 56 are closed. Furthermore, the AC terminal switches 36a, 36b, 36c and the neutral terminal switch 40 are closed. Thus, each of the control unit strings 28, 30, 32 is electrically connected to one of the AC terminal switches 36a, 36b, 36c.

It is noted that the electrical arrangement of the cell-level control units 22 in three control unit strings 28, 30, 32 does not necessarily mean that they are mechanically positioned in the same manner. Taking the battery control assembly 18 of FIG. 6 as an illustrative example, the cell-level control units 22 of the control unit string 28 and the cell-level control units 22 of the control unit string 30 being represented below inner connection terminal 30c could be mechanically arranged in one row while the remaining cell-level control units 22 could be arranged in a separate, second row.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A battery control assembly for a battery system, the battery control assembly comprising:
a plurality of cell-level control units, each of the cell-level control units being electrically connectable to an associated single battery cell or to an associated group of battery cells, and each of the cell-level control units comprising a cell-level switching unit being operable as a cell-level inverter,
the plurality of cell-level control units being arranged in three control unit strings, the cell-level control units of each control unit string being electrically connected in series, and each of the control unit strings comprising a first end and a second end, the second end being arranged electrically opposite the first end,
the first end of each control unit string being electrically connected to a corresponding AC charging terminal,
the second ends of the three control unit strings being electrically connected in series via a first end switch and a second end switch, and
at least one of the control unit strings comprising an inner connection terminal being arranged such that at least one cell-level control unit forming part of the respective control unit string is arranged on each side of the inner connection terminal, the inner connection terminal being connectable to a DC charging or discharging terminal or a further inner connection terminal.

2. The battery control assembly according to claim 1, wherein each first end is electrically connected to the respective AC charging terminal via a respective AC terminal switch.

3. The battery control assembly according to claim 1, wherein at least one of the second ends is electrically connected to a neutral terminal via a neutral terminal switch.

4. The battery control assembly according to claim 1, wherein each of the first ends is electrically connected to a respective first AC machine terminal for connecting a first AC electric machine to the battery control assembly.

5. The battery control assembly according to claim 4, wherein at least two out of the first ends are electrically connected to the respective first AC machine terminal via a respective first AC machine terminal switch and a respective second AC machine terminal switch.

6. The battery control assembly according to claim 1, wherein each of the second ends is electrically connected to a respective second AC machine terminal for connecting a second AC electric machine to the battery control assembly.

7. The battery control assembly according to claim 1, wherein at least one of the control unit strings comprises a DC output interface having a first DC output terminal and a second DC output terminal.

8. The battery control assembly according to claim 1, wherein at least two out of the first ends are electrically connected via a third end switch.

9. The battery control assembly according to claim 8, wherein the first ends are electrically connected in series via the third end switch and a fourth end switch.

10. The battery control assembly according to claim 1, wherein each control unit string comprises an inner connection terminal and the inner connection terminals are electrically connected in series via a respective first inner switch and a respective second inner switch.

11. The battery control assembly according to claim 1, wherein one inner connection terminal or at least one of the first ends is electrically connected to a first DC charging and discharging terminal.

12. The battery control assembly according to claim 1, wherein at least one of the first ends and/or at least one of the second ends is connected to a second DC charging and discharging terminal.

13. An electric drivetrain for an electric vehicle having the battery control assembly according to claim 1.

14. The electric drivetrain according to claim 13, comprising:
a first AC electric machine being electrically connected to the battery control assembly via the first AC machine terminals, and/or
a second AC electric machine being electrically connected to the battery control assembly via the second AC machine terminals.

15. The electric drivetrain according to claim 13, wherein a single battery cell or a group of battery cells is electrically connected to each of the cell-level control units.

* * * * *